United States Patent Office 3,562,327
Patented Feb. 9, 1971

---

3,562,327
PRODUCTION OF ALKYLENE GLYCOL DI-(ACRYLAMIDE-N-METHYL)ETHERS
Harro Petersen, Frankenthal, Germany, assignor to Badische Anilin- & Soda-Fabrik Aktiengesellschaft, Ludwigshafen (Rhine), and Rheinland-Pfalz, Germany
No Drawing. Filed Apr. 16, 1969, Ser. No. 816,803
Claims priority, application Germany, Apr. 19, 1968,
P 17 68 240.5
Int. Cl. C07c $103/30$
U.S. Cl. 260—561                                   7 Claims

ABSTRACT OF THE DISCLOSURE

Production of alkylene glycol di-(acrylamide-N-methyl) ethers by reaction of acrylamide-N-methylol compounds with dialcohols in the presence of phthalic acid. The products are valuable starting materials for the production of plastics, resins and plasticizers.

---

The invention relates to the production of alkylene glycol di-(acrylamide-N-methyl) ethers by the reaction of acrylamide-N-methylol compounds with dialcohols in the presence of phthalic acid.

It is known from Houben-Weyl, "Mothoden der Organischen Chemie," volume XIV/2, page 371 et seq., that N-methylol compounds of carboxylic amides can be reacted with alcohols in the presence of acids to form N-alkoxymethylamides. Mineral acids, for example, hydrochloric or sulfuric acid, are generally used for this purpose. In addition to the desired alkoxymethyl compounds hydrolysis products as well as methylenediamides and perhydrotriazines are formed. The alcohol is therefore always used in a large excess in the reaction with a methylolamide. When methylol compounds of acrylamide or methacrylamide are reacted with an alcohol in the presence of a mineral acid, unsatisfactory yields are generally obtained because polymerizations take place and some of the acid adds on to the double bond.

The production of the methylolacrylamide ethers of ethylene and propylene glycols and other 1,2-dialcohols or 1,3-dialcohols offers particular difficulty. In addition to the shortcomings outlined above, there is the difficulty that etherification is more or less restricted to one hydroxyl group when an excess of dialcohol is used. When a deficiency is used, compounds of the type of methylenediacrylamide and triacrylol perhydrotriazine are formed.

The object of this invention is to provide a new process of producing alkylene glycol di-(acrylamide-N-methyl) ethers in good yields and high purity which is easy to carry out.

This and other objects of the invention are achieved and alkylene glycol di-(acrylamide-N-methyl) ethers having the general formula:

$$CH_2=C-CO-NH-CH_2-O-[CH]-O-CH_2-HN-CO-C=CH_2 \quad (I)$$
$$\phantom{CH_2=C}|\phantom{-CO-NH-CH_2-O-}|\phantom{CH}\phantom{-O-CH_2-HN-CO-C}|$$
$$\phantom{CH_2=C}R^1\phantom{-CO-NH-CH_2-O-}[R^2{}_n]\phantom{-O-CH_2-HN-CO-C}R^1$$

where $R^1$ and $R^2$ may be identical or different and each denotes a hydrogen atom or an alkyl radical and $n$ denotes one of the integers 2 and 3 are obtained advantageously from carboxylic amide N-methylol compounds and dialcohols in the presence of an acid, by reacting a N-methylolacrylamide having the general formula:

$$CH_2=C-CO-NH-CH_2OH \quad (II)$$
$$\phantom{CH_2=C}|$$
$$\phantom{CH_2=C}R^1$$

where $R^1$ has the meanings given above, with a dialcohol having the general formula:

$$HO-[CH]-OH \quad (III)$$
$$\phantom{HO-}[R^2{}_n]$$

where $R^2$ and $n$ have the meanings given above in a molar ratio of about 2:1 in the presence of phthalic acid.

When N-methylolacrylamide and ethylene glycol are used, the reaction may be represented by the following equation:

$$2CH_2=CH-CO-NH-CH_2OH$$
$$+HO-CH_2-CH_2-OH$$
$$CH_2=CH-CO-NH-CH_2-O-CH_2-CH_2$$
$$-O-CH_2-NH-CO-CH=CH_2+2H_2O$$

The process according to this invention surprisingly gives alkylene glycol di-(acrylamide-N-methyl) ethers in a simple way, in good yields and in high purity without the said secondary reactions playing any appreciable part.

Preferred N-methylolacrylamides having the general Formula II and consequently preferred end products (I) are those in whose formulae $R^1$ denotes a hydrogen atom or an alkyl radical having one to three carbon atoms. Particularly preferred starting materials (II) are N-methylolacrylamide and N-methylolmethacrylamide.

The starting materials (II) are reacted with dialcohols having the general Formula III in the molar ratio of about 2:1. Preferred dialcohols (III) and consequently preferred end products (I) are those in whose formulae $R^2$ denotes a hydrogen atom or an alkyl radical having one to three carbon atoms and $n$ denotes one of the integers 2 and 3. The radical $R^2$ may be identical with or different from the radical $R^1$. For example, the following dialcohols may be used as starting material (III): ethylene glycol, 1,2-propylene glycol, 1,3-propylene glycol, neopentyl glycol, 2,3-butylene glycol and 2,4-pentylene glycol.

The reaction is generally carried out at a temperature of from 50° to 140° C., preferably from 90° to 120° C., at atmospheric or superatmospheric pressure, continuously or batchwise. Phthalic acid is used in the reaction, as a rule in an amount of from 2 to 30%, preferably from 4 to 10% by weight with reference to the starting material (III). It may be advantageous to use organic solvents which are not miscible with water and which are inert under reaction conditions, such as aromatic hydrocarbons, for example, toluene or xylene. Water formed in the reaction is advantageously removed from the mixture. A preferred embodiment of the process uses a solvent, for example, toluene, by means of which water or reaction may be removed azeotropically during the reaction. The solvent is generally used in an amount of from 50 to 200% by weight with reference to starting material (II).

The reaction may be carried out as follows:

The starting materials (II) and (III) and phthalic acid (with or without a solvent) are kept for about two to five hours at the reaction temperature, water formed being separated if desired. The reaction mixture is then cooled and neutralized, two phases being formed. The lower phase is separated and a solvent is added which is suitable for recrystallization, for example, methanol. The end product which crystallizes out from the mixture is separated.

Compounds which can be prepared by the process according to this invention are valuable starting materials for the production of plastics, resins and plasticizers.

Reference is made to French Pats. 1,520,856 and 1,557,238 and Belgian Pat. 702,757 with regard to the use of the end products.

The invention is illustrated by the following example.

EXAMPLE

A mixture of 1,010 parts of N-methylolacrylamide, 1,000 parts of toluene, 310 parts of ethylene glycol and 20 parts of phthalic acid is heated under reflux in a stirred apparatus provided with a water separator. In the course of three hours, a total of 180 parts of water is removed at a temperature of from 105° to 112° C. The reaction mixture is cooled to 50° C. and neutralized with 30% sodium methylate solution. Two phases form and the lower phase is separated through a separating funnel and 200 parts of methanol is added to it. The whole is allowed to stand for one day at 0° C. and the deposited crystalline end product is filtered off and dried. 992 parts of ethylene glycol di-(acrylamide-N-methyl) ether is obtained. This is a yield of 87% of the theory. The end product is recrystallized from ethyl acetate to purify it. The melting point is 98° C.

*Analysis.*—Calculated for $C_{10}H_{16}O_4N_2$ (228), percent: C, 52.6; H, 7.02; O, 28.1; N, 12.3; $CH_2O$ 26.3. Found (percent): C, 52.4; H, 7.0; O, 28.0; N, 12.1; $CH_2O$ 26.1.

We claim:

1. A process for the production of alkylene glycol di-(acrylamide-N-methyl) ethers having the general formula:

where $R^1$ and $R^2$ may be identical or different and each denotes a hydrogen atom or an alkyl radical and $n$ denotes one of the integers 2 and 3 from a carboxylic amide N-methylol compound and an alcohol in the presence of an acid, wherein a N-methylolacrylamide having the general formula:

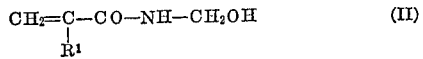

where $R^1$ has the above meanings, is reacted with a dialcohol having the general formula:

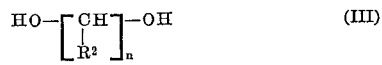

where $R^2$ and $n$ have the above meanings, in a molar ratio of about 2:1 in the presence of phthalic acid.

2. A process as claimed in claim 1 wherein the reaction is carried out at a temperature of from 50° to 140° C.

3. A process as claimed in claim 1 carried out at a temperature of from 90° to 120° C.

4. A process as claimed in claim 1 carried out in the presence of phthalic acid in an amount of from 2 to 30% by weight with reference to starting material (III).

5. A process as claimed in claim 1 wherein the reaction is carried out in the presence of from 4 to 10% by weight of phthalic acid with reference to starting material (III).

6. A process as claimed in claim 1 carried out in the presence of an organic solvent which is not miscible with water and which is inert under the reaction conditions.

7. A process as claimed in claim 6 wherein the amount of solvent is from 50 to 200% by weight with reference to the starting material (II).

References Cited

UNITED STATES PATENTS 3,079,434  2/1963  Christenson et al. ____ 260—561
3,280,189  10/1966  Cline _____ 260—561

LEWIS GOTTS, Primary Examiner

E. G. LOVE, Assistant Examiner

U.S. Cl. X.R.

260—89.7

PO-1050
(5/69)

UNITED STATES PATENT OFFICE
CERTIFICATE OF CORRECTION

Patent No. 3,562,327  Dated February 9, 1971

Inventor(s) Harro Petersen

It is certified that error appears in the above-identified patent and that said Letters Patent are hereby corrected as shown below:

Column 1, line 57, formula I, that portion of the formula reading "$\begin{bmatrix} CH \\ | \\ R^2n \end{bmatrix}$" should read -- $\begin{bmatrix} CH \\ | \\ R^2 \end{bmatrix}_n$ --.

Column 1, line 72, formula III, that portion of the formula reading "$\begin{bmatrix} CH \\ | \\ R^2n \end{bmatrix}$" should read -- $\begin{bmatrix} CH \\ | \\ R^2 \end{bmatrix}_n$ --.

Column 2, line 45, "or" should read -- of --.

Signed and sealed this 29th day of June 1971.

(SEAL)
Attest:

EDWARD M. FLETCHER, JR.
Attesting Officer

WILLIAM E. SCHUYLER, JR
Commissioner of Patents